(12) United States Patent
Yanagisawa et al.

(10) Patent No.: US 8,149,887 B2
(45) Date of Patent: Apr. 3, 2012

(54) PLANAR WAVEGUIDE LASER DEVICE

(75) Inventors: Takayuki Yanagisawa, Tokyo (JP); Yoshihito Hirano, Tokyo (JP); Shuhei Yamamoto, Tokyo (JP); Yasuharu Koyata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/669,966

(22) PCT Filed: Jul. 27, 2007

(86) PCT No.: PCT/JP2007/064790
§ 371 (c)(1),
(2), (4) Date: Jan. 21, 2010

(87) PCT Pub. No.: WO2009/016703
PCT Pub. Date: Feb. 5, 2009

(65) Prior Publication Data
US 2010/0189151 A1    Jul. 29, 2010

(51) Int. Cl.
*H01S 3/16* (2006.01)
(52) U.S. Cl. ............... 372/41; 372/70; 372/105
(58) Field of Classification Search ............ 372/45.01, 372/41
See application file for complete search history.

(56) References Cited

U.S. PATENT DOCUMENTS

| | | | |
|---|---|---|---|
| 3,421,097 A * | 1/1969 | Koester et al. | 359/341.1 |
| 5,561,547 A | 10/1996 | Keirstead et al. | |
| 6,141,365 A * | 10/2000 | Bowler | 372/46.01 |
| 7,403,549 B2 | 7/2008 | Koyata et al. | |
| 2005/0265403 A1 * | 12/2005 | Anderson et al. | 372/20 |
| 2006/0233209 A1 * | 10/2006 | Kirilov | 372/39 |
| 2008/0095202 A1 | 4/2008 | Yanagisawa et al. | |

FOREIGN PATENT DOCUMENTS

| | | |
|---|---|---|
| JP | 3-36779 | 2/1991 |
| JP | 6 214130 | 8/1994 |
| JP | 6 331824 | 12/1994 |
| JP | 9 507725 | 8/1997 |
| JP | 10 123343 | 5/1998 |

(Continued)

OTHER PUBLICATIONS

Chen, Feng et al., "Optical waveguides formed in Nd:YVO4 by MeV Si* implantation", Applied Physics Letters, vol. 80, No. 19, pp. 3473-3475, (May 13, 2002).*

(Continued)

*Primary Examiner* — Jessica Stultz
*Assistant Examiner* — Xnning Niu
(74) *Attorney, Agent, or Firm* — Oblon, Spivak, McClelland, Maier & Neustadt, L.L.P.

(57) ABSTRACT

A planar waveguide laser device forms a waveguide by a plate-like laser medium having birefringence and clad attached to at least one of the surfaces of the laser medium perpendicular to its thickness direction, amplifies laser light by a gain produced by excitation light incident on the laser medium, and performs laser oscillation. The laser medium is formed of a material having an optic axis on a cross section perpendicular to the light axis, which is the laser travelling direction. The clad is formed of a material having a refractive index in a range between refractive indexes of two polarized lights that travel along the light axis in the laser medium and have oscillation surfaces that are orthogonal to each other. The planar waveguide laser device readily oscillates linearly polarized laser light.

7 Claims, 7 Drawing Sheets

FOREIGN PATENT DOCUMENTS

JP       11 23875       1/1999
JP       2004 296671       10/2004

OTHER PUBLICATIONS

D. Kasprowicz et al., "Elastic properties of Ky(WO4)2 single crystals studied by Brillouin spectroscopy", Journal of Alloys and Compounds, pp. 671-674, 2009.*

Chen, Feng et al., "Optical waveguides formed in Nd:YVO$_4$ by MeV Si$^+$ implantation", Applied Physics Letters, vol. 80, No. 19, pp. 3473-3475, (May 13, 2002).

MacKenzie, Jacob I. et al., "Multi-Watt, High Efficiency, Diffraction-Limited Nd: YAG Planar Waveguide Laser", IEEE Journal of Quantum Electronics, vol. 39, No. 3, pp. 493-500, (Mar. 2003).

Honda, Tokuyuki et al., "Broad Tuning of Nd:YVO$_4$ Green Laser by Temperature Control of Intracavity KTiOPO$_4$", Jpn. J. Appl. Phys., vol. 32, Part 1, No. 1A, pp. 97-98, (Jan. 1993).

U.S. Appl. No. 12/675,447, filed Feb. 26, 2010, Yamamoto, et al.
U.S. Appl. No. 12/667,827, filed Mar. 12, 2010, Koyata, et al.
U.S. Appl. No. 13/141,910, Jun. 23, 2011, Yamamoto, et al.
Office Action issued Apr. 26, 2011, in Japanese Patent Application No. 2009-525197 (with English-language translation).

* cited by examiner

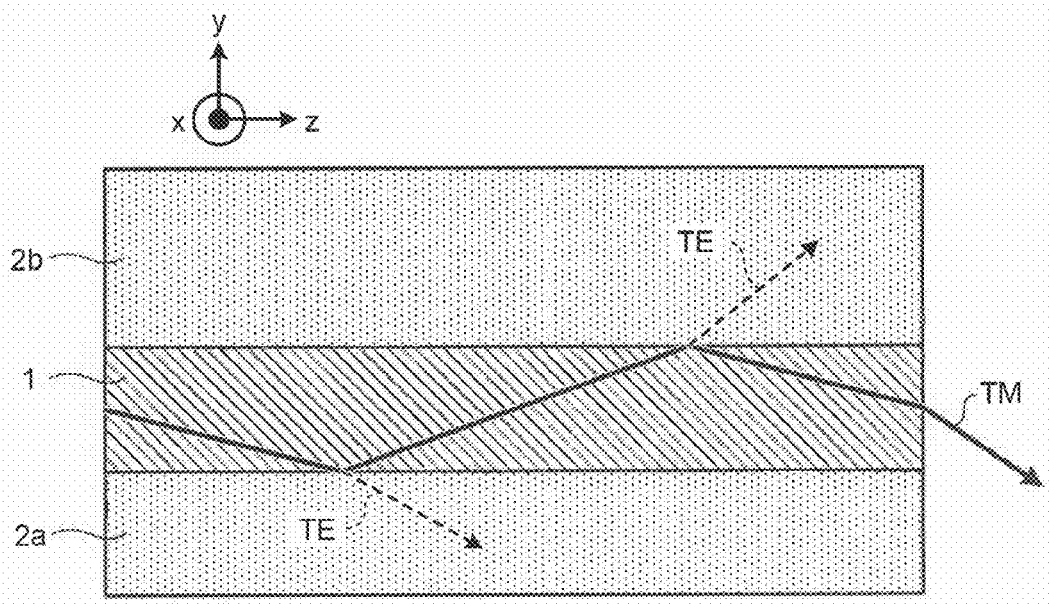

POLISHING

OPTICAL BONDING, ADHERING, OR VAPOR DEPOSITION

CUTTING

PLANAR WAVEGUIDE LASER DEVICE

TECHNICAL FIELD

The present invention relates to a planar waveguide laser device having a planar waveguide structure that is suitable for a light source of a printer, a projection television, and the like.

BACKGROUND ART

A planar waveguide laser has a structure in which a thin, plate-like laser medium that extends in a laser light traveling direction is sandwiched from its top and bottom surfaces by a clad that has a lower refractive index than that of the laser medium. The structure causes the laser medium to function also as a waveguide. Because of its small waveguide thickness and high excitation density, the planar waveguide laser can attain a high gain even when a laser medium having a small cross section area for stimulated emission is adopted. This realizes an oscillation operation with a high degree of efficiency. Furthermore, by widening the waveguide in its width direction, scaling of the output can be realized while the excitation density is maintained at a predetermined value. However, the gain is high and oscillations easily occur in multiple waveguide modes. Thus, challenges are to oscillate laser light with linear polarization that is required at the time of wavelength conversion and to oscillate laser light restricted to a desired mode. Further challenges are to output laser light with high efficiency by reducing amplification of unnecessary light (parasitic amplification) and parasitic oscillation, which occurs by the trapping of light in the waveguide because of the total reflection on the external surfaces and end surfaces of the clad.

Therefore, planar waveguide laser devices that realize laser oscillation in a desired mode have been conventionally suggested (refer to Non-patent Document 1, for example). This planar waveguide laser device has a structure in which a waveguide core is formed by incorporating Nd:YAG (yttrium aluminum garnet: $Y_3Al_5O_{12}$) as a core and attaching a non-doped YAG to the top and bottom surfaces of the core, and this waveguide core is further sandwiched by a sapphire crystal that serves as the clad layers from the top and bottom surfaces (i.e., the non-doped YAG surfaces). In such a waveguide structure, oscillation can occur in more than one waveguide mode. However, it is possible to cause oscillation only in the waveguide basic mode by making the core to have a gain at only around its center so as to cause a gain difference between the waveguide basic mode and the waveguide higher mode. Also, the basic mode can be selectively oscillated as the oscillation mode in the width direction of the waveguide by conforming the incident form of the excitation light to the form of the basic mode.

Non-patent Document 1: Jacob I. Mackenzie, Cheng Li, and David P. Shepherd, "Multi-Watt, High Efficiency, Diffraction-limited Nd:YAG Planar Waveguide Laser", IEEE Journal of Quantum Electronics, Vol. 39 (2003), p. 495

DISCLOSURE OF INVENTION

Problem to be Solved by the Invention

In the planar waveguide laser device according to the Non-patent Document 1, however, the waveguide performs propagation in modes of transverse electric (TE) polarization (where its oscillation surface is perpendicular to a plane formed by a c-axis and a light axis that is the laser traveling direction and is present on a plane that includes the light axis; also referred to as ordinary ray) and transverse magnetic (TM) polarization (where its oscillation surface is present on the plane formed by the c-axis and the light axis; also referred to as extraordinary ray). The gains of the TE polarization and the TM polarization are equal to each other. Therefore, the two polarized laser lights become oscillated, which is problematic because the output of the linear polarization cannot be attained.

In addition, the light that does not satisfy the total reflection condition in the core is reflected on the external surfaces of the clad layers and the end surfaces of the planar waveguide laser device in the laser projection direction, and parasitic oscillation and parasitic amplification are thereby caused with the light circulating inside the waveguide. This is problematic because the laser oscillation efficiency of the desired laser light is reduced.

The present invention has been conceived in view of the above, and its object is to provide a planar waveguide laser device that facilitates oscillation of linearly polarized laser. Another object is to provide a high-efficiency planar waveguide laser device, which suppresses the parasitic amplification and the parasitic oscillation inside the waveguide.

Means for Solving Problem

To achieve the object, a planar waveguide laser device according to the present invention forms a waveguide by a plate-like laser medium having birefringence and clad attached to at least one of surfaces of the laser medium perpendicular to a thickness direction thereof, amplifies laser light by a gain produced by excitation light incident on the laser medium, and performs laser oscillation, wherein the laser medium is formed of a birefringent material that has an optic axis on a cross section perpendicular to a light axis that is a direction in which the laser light travels, and the clad is formed of a material having a refractive index in a range between refractive indexes of two polarized lights that travel along the light axis in the laser medium and have oscillation surfaces that are orthogonal to each other.

EFFECT OF THE INVENTION

According to the present invention, a material having a refraction index in a range between the TE polarization refraction index and the TM polarization refraction index of the laser medium is adopted for the clad, and thus either one of TE polarization and TM polarization does not satisfy the total reflection condition. Hence, the laser oscillation can be performed for either one of the polarizations that satisfies the total reflection condition.

BRIEF DESCRIPTION OF DRAWINGS

FIG. 1-2 is a schematic diagram showing a cross section of the structure of the planar waveguide laser device according to the first embodiment.

FIG. 2 is a schematic diagram showing polarization dependence of laser propagation in the planar waveguide laser device according to the first embodiment.

FIG. 3-1 is a schematic diagram showing an example procedure of a method of manufacturing the planar waveguide laser device according to the present invention (part 1).

FIG. 3-2 is a schematic diagram showing an example procedure of the method of manufacturing the planar waveguide laser device according to the present invention (part 2).

FIG. 3-3 is a schematic diagram showing an example procedure of the method of manufacturing the planar waveguide laser device according to the present invention (part 3).

FIG. 3-4 is a schematic diagram showing an example procedure of the method of manufacturing the planar waveguide laser device according to the present invention (part four).

FIG. 3-5 is a schematic diagram showing an example procedure of the method of manufacturing the planar waveguide laser device according to the present invention (part five).

FIG. 3-6 is a schematic diagram showing an example of the procedure of the method of manufacturing the planar waveguide laser device according to the present invention (part 6).

FIG. 4 is a schematic diagram showing examples of travelling paths of the laser in the planar waveguide laser device according to the first embodiment.

FIG. 5-1 is a schematic diagram showing a perspective view of a structure of a planar waveguide laser device according to a second embodiment of the present invention.

FIG. 5-2 is a schematic diagram showing a cross section of the structure of the planar waveguide laser device according to the second embodiment.

FIG. 6 is a schematic diagram showing laser propagation by the planar waveguide laser device according to the second embodiment.

EXPLANATIONS OF LETTERS OR NUMERALS

1 Laser medium
2a, 2b Clad
3 Substrate
4 Bonding agent
5a, 5b Absorption layers

BEST MODE(S) FOR CARRYING OUT THE INVENTION

Exemplary embodiments of a planar waveguide laser device according to the present invention are described in detail below with reference to the attached drawings. The invention, however, should not be restricted to these embodiments. In addition, perspective views and cross sections of the planar waveguide laser device according to the embodiments are presented only in a schematic manner, and thus the relationship between the thicknesses and widths of the layers and the ratio of the thicknesses of the layers may be different from the actual dimensions.

First Embodiment

Figure 1:
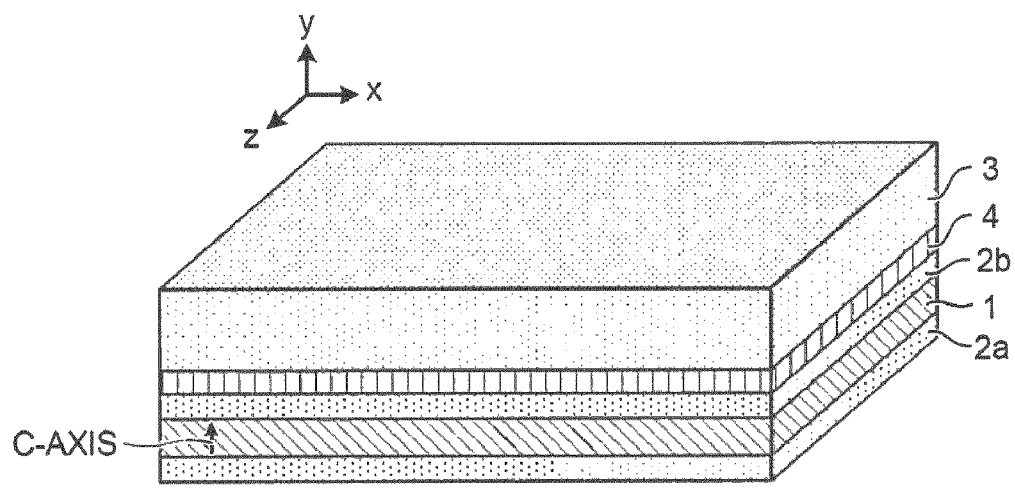
FIG. 1-1 is a schematic diagram showing a perspective view of a structure of a planar waveguide laser device according to a first embodiment of the present invention.

FIG. 1-1 is a schematic diagram showing a perspective view of a structure of a planar waveguide laser device according to a first embodiment of the present invention.

Figures 1, 2:
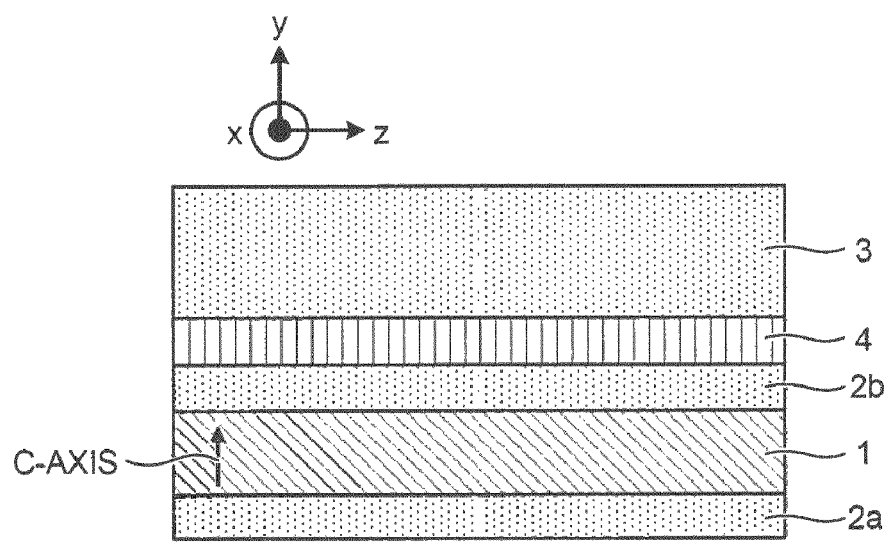

FIG. 1-2 is a schematic diagram showing a cross section of the structure of the planar waveguide laser device according to the first embodiment. The planar waveguide laser device includes a laser medium 1 having a plate-like shape and clad 2a and 2b provided on both the top and bottom surfaces of this laser medium 1. In addition, a substrate 3 is adhered to the outer surface of either one of the clad 2a and 2b (clad 2b in this example) by way of a bonding agent 4. In FIGS. 1-1 and 1-2, it is assumed that, in a plane parallel to the rectangular top and bottom surfaces having the largest area in the laser medium 1, directions parallel to two orthogonal sides of this plane are x-axis and z-axis and that a direction perpendicular to these two axes, the x-axis and the z-axis, is y-axis. Here, it is assumed that a z-axis direction is a light axis that is a propagation direction (travelling direction) of laser light. Furthermore, a shape parallel to the xy plane of the laser medium 1 is a rectangle, in which an x-axis direction side is longer than a y-axis direction side.

The laser medium 1 is formed of, for example, a birefringent material (optically anisotropic material) that creates a state of population inversion by excitation light and amplifies the laser light generated by stimulated emission. This laser medium 1 is arranged in such a manner that its optic axis, which is a direction in which lightwave speed (refractive index) is unique in the material, is positioned on the xy plane. Particularly, it is preferable that the optic axis of the laser medium 1 be positioned in either x-axis or y-axis direction in the drawing. In the example described below, the optic axis is arranged to be positioned in the x-axis or y-axis direction. Furthermore, it is preferable from the aspect of design that the birefringent material of the laser medium 1 be optically uniaxial crystal in which the optic axis is in agreement with a c-axis direction of the crystal axes.

The clad 2a and 2b is formed of a material having a refractive index nc in the range between nx and ny, where nx represents the refractive index of the laser medium 1 for the light polarized in the x-axis direction and ny represents the refractive index thereof for the light polarized in the y-axis direction. In the example explained below, a material having the refractive index nc that satisfies nx<nc<ny is adopted for the clad 2a and 2b.

Examples of combinations of the laser medium 1 and the clad 2a and 2b that satisfy the above conditions include a combination of the laser medium 1 formed of a material containing $YVO_4$ as a base material and the clad 2a and 2b formed of a material $Ta_2O_5$, and a combination of the laser medium formed of a material containing $GdVO_4$ as a base material and the clad 2a and 2b formed of the material $Ta_2O_5$.

When Nd:$YVO_4$ (tetragonal crystal) is arranged for the laser medium 1 in such a manner that the c-axis (which is a crystal axis and also an optic axis) runs in the y-axis direction, the Nd:$YVO_4$ has a refractive index no of approximately 1.96 (=nx) for an ordinary ray (light polarized in the x-axis direction) and a refractive index ne of approximately 2.17 (=ny) for an extraordinary ray (light polarized in the y-axis direction) at the wavelength of 914 nanometers. In addition, a $Ta_2O_5$ dielectric film having a refractive index nc of approximately 2.08 at the wavelength of 914 nanometers has a refractive index that falls between the ordinary ray refractive index (no=nx) and the extraordinary ray refractive index (ne=ny) of the Nd:$YVO_4$, and thus it can be used for the clad 2a and 2b.

The substrate 3 is adhered to the clad 2b with the bonding agent 4 so that rigidity can be increased and handleability can be improved during the production of the waveguide that includes the laser medium 1 and the clad 2a and 2b. For the substrate 3, the base material of the laser medium that is not doped with active ions, such as non-doped $YVO_4$, may be adopted. Furthermore, an adhesive can be used for the bonding agent 4. If the laser medium 1 and the clad 2a and 2b can provide sufficient rigidity by themselves, the substrate 3 may not be incorporated.

The structure of the laser medium 1 sandwiched by the clad 2a and 2b from its top and bottom surfaces forms a waveguide for a linearly polarized laser light that exhibits a refractive index of the laser medium 1 greater than the refractive index nc of the clad 2a and 2b. In other words, the laser medium 1 functions, for such a laser light (linearly polarized light), as a laser medium and also as a core that guides laser light waves generated from stimulated emission by irradiation of excitation light.

The operation of the planar waveguide laser device having the above structure is explained below. FIG. 2 is a schematic diagram showing polarization dependence of the laser propagation in the planar waveguide laser device according to the first embodiment. As described above, the planar waveguide laser device having the structure in which the clad 2a and 2b of $Ta_2O_5$ dielectric films are arranged on the top and bottom surfaces of the laser medium 1, which is formed of $Nd:YVO_4$ shaped into a plate with its c-axis (optic axis) positioned in the y-axis direction, is used as an example in the following explanation. The refractive indexes are nx(=no) of approximately 1.96 and ny(=ne) of approximately 2.17, and nc=2.08.

The excitation light is incident from the left side of the laser medium 1 of FIG. 2 along the z-axis. The laser medium 1 absorbs the excitation light incident from the outside and generates a gain. Then, when a laser light is generated by stimulated emission induced by spontaneously emitted light that travels in the z-axis direction or the like, the laser medium 1 gives the gain to the generated laser light to amplify the laser light. Here, if the refractive index of the core (the refractive index of the laser medium 1) is greater than the refractive index of the clad, a component of the propagating light in the waveguide that satisfies the total reflection condition at the interfaces between the core and the clad 2a and 2b becomes confined within the core so that the light component propagates in a waveguide mode. In contrast, if the refractive index of the core is smaller than the refractive index of the clad, the light escapes into the clad 2a and 2b at the interfaces between the core and the clad 2a and 2b, and an emission mode occurs, which causes a large loss.

As an example shown in FIG. 2, among the laser light that propagates in the z-axis direction in the laser medium 1, the refractive index that the laser light having y-axis polarized light (TM-mode laser light) experiences is ny of approximately 2.17, which is greater than the refractive index of the clad, nc of approximately 2.08. Thus, the laser light propagates through the planar waveguide laser device in the waveguide mode. In contrast, the refractive index that the laser light having the x-axis polarized light (TE-mode laser light) experiences is nx of approximately 1.96, which is smaller than the refractive index of the clad, nc of approximately 2.08. Thus, the total reflection does not occur at the interfaces between the core (laser medium 1) and the clad 2a and 2b, and therefore the emission mode occurs. As a result, a large loss is produced during the propagation of the TE-mode laser light through the planar waveguide laser device. Hence, only the TM-mode laser light is selectively amplified in the planar waveguide laser device of this example.

In the above manner, the planar waveguide laser device serves as a laser amplifier that amplifies and outputs the y-axis polarization component only, by the incidence of the laser light into the planar waveguide laser device in parallel with the z-axis direction. In addition, by positioning a total reflector on one side of the laser medium 1 perpendicular to the z-axis (on the side of the excitation light source) and a partial reflector on the other side, lasing occurs between the total reflector and the partial reflector, and part of the laser light oscillated by the partial reflector is output. At this point, the lasing of the TE-mode laser light is suppressed because of a large loss, and the lasing of only the TM-mode laser light is conducted, which results in the output of the linearly polarized light. Thus, in the planar waveguide laser device according to the first embodiment, the linearly polarized light can be output at high efficiency, without adding any optical element such as a polarizer to restrict the polarization. The total reflector and the partial reflector may be realized by forming a dielectric film or a metallic film directly on the surface of the laser medium 1 perpendicular to the z-axis.

The structure explained above is particularly effective when the stimulated emission cross sectional areas of the laser medium 1 in the x-axis and y-axis directions are approximately the same. It realizes the oscillation of the laser light linearly polarized in the y-axis direction at high efficiency, by suppressing the oscillation in the x-axis direction.

Figures 1, 3:
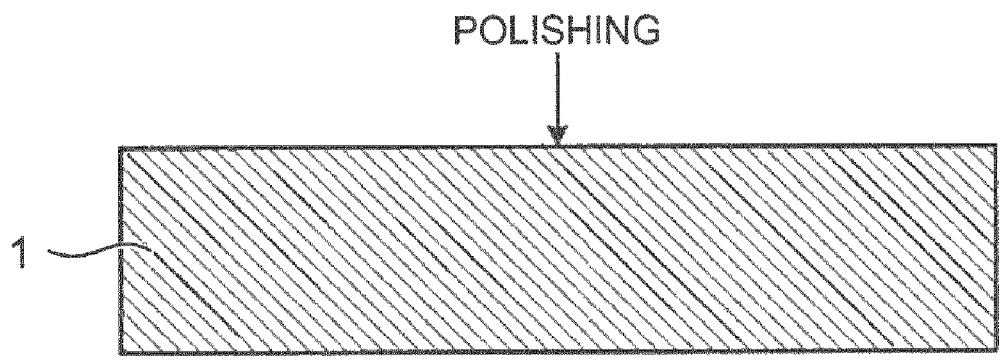
Figures 2, 3:
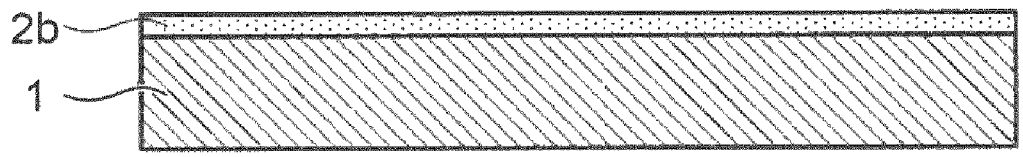
Figure 3:
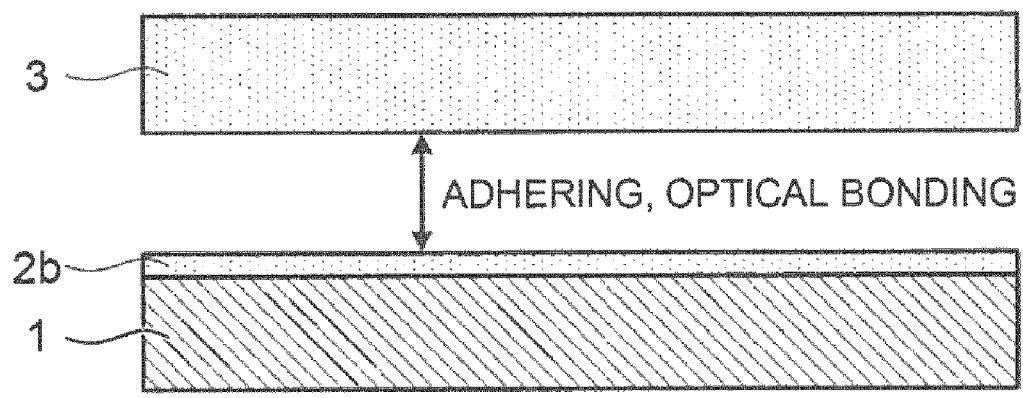

Next, the method of manufacturing the planar waveguide laser device that has the above structure is explained. FIGS. 3-1 to 3-6 are schematic diagrams showing an example of the procedure of the method of manufacturing the planar waveguide laser device according to the present invention. First, after the laser medium 1 is cut into a plate, one of the largest surfaces (zx surfaces) is polished (FIG. 3-1).

Thereafter, the clad 2b formed of a material having the refractive index nc that satisfies nx<nc<ny is adhered to the polished surface of the laser medium 1 (FIG. 3-2). This clad 2b may be adhered directly to the laser medium 1 by a method such as optical contact or diffusion bonding, or may be adhered to the laser medium 1 by use of an optical adhesive having a smaller refractive index than that of the laser medium 1. Furthermore, a thin film of the clad 2b may be formed onto the polished surface of the laser medium 1 by sputtering, vapor deposition, chemical vacuum deposition (CVD), or the like.

Then, the substrate 3 is adhered to the other surface of the clad 2b opposite to the surface adhered to the laser medium 1 (FIG. 3-3). This substrate 3 may be adhered directly to the clad 2b by a method such as optical contact or diffusion bonding, or the substrate 3 that is formed of a metal or an optical material may be adhered by use of an optical adhesive having a smaller refractive index than that of the laser medium 1. Here, the clad 2b and the substrate 3 are adhered to each other with the adhesive 3. The surface of the clad 2b may be polished to be planarized before the adhesion of the substrate 3 to the clad 2b.

Figures 3, 4:
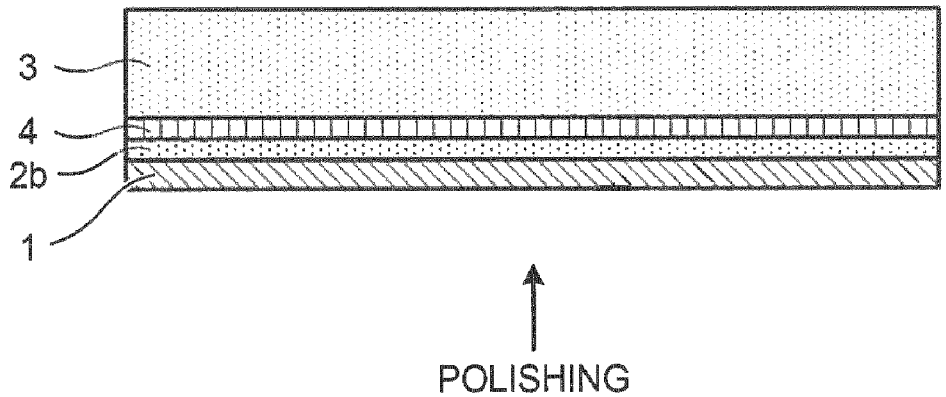
Figures 3, 4, 5:
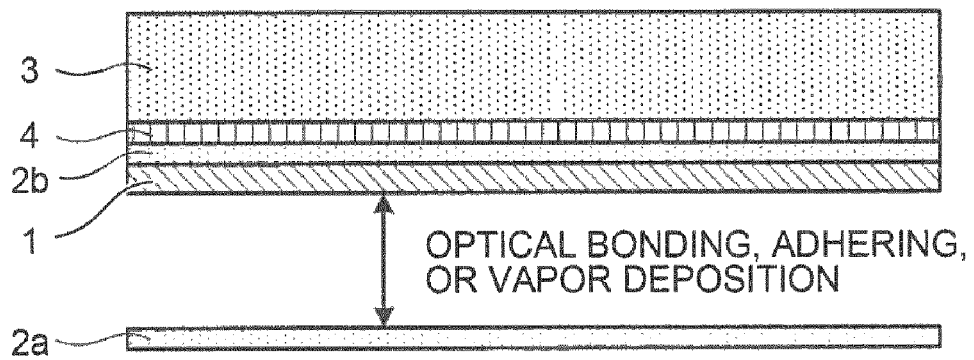

Thereafter, the surface of the laser medium 1 (zx surface) that is not supported by the substrate 3 is polished to a predetermined thickness (FIG. 3-4). Then, the clad 2a formed of a material having the refractive index nc that satisfies nx<nc<ny is adhered to the polished surface of the laser medium 1 (FIG. 3-5). This clad 2a may be adhered in the same manner as the clad 2b that is adhered as shown in FIG. 3-2. Then, the layered structure of the laser medium 1, the clad 2a and 2b, and the substrate 3 is cut in a direction perpendicular to the substrate surface and thus a planar waveguide laser device of a desired size can be achieved (FIG. 3-6).

The above discussion deals with a structure that includes the clad 2a and 2b having the refractive index nc that satisfies nx<nc>ny on the top and bottom surfaces of the laser medium 1. However, the same effect can be attained from a structure that includes the clad having the refractive index nc on either one of the top and bottom surfaces of the laser medium 1. In such a structure, the surface of the laser medium 1 that does not have any clad of the refractive index nc may be provided with nothing thereon and brought into contact with air (by adopting air as the clad), or a material having any refractive index smaller than the refractive index nx of the laser medium 1 for the light polarized in the x-axis direction may be adopted for the clad.

In addition, the clad 2b on the side of the substrate 3 may be omitted from FIGS. 1-1 and 1-2, and the laser medium 1 may be adhered to the substrate 3 with the bonding agent 4 having any refractive index smaller than the refractive index nx of the laser medium 1 for the light polarized in the x-axis direction. Otherwise, the substrate 3 having any refractive index smaller than the refractive index nx of the laser medium 1 for the light polarized in the x-axis direction may be adhered directly to the laser medium 1. When the substrate 3 is adhered directly to the laser medium 1, optical contact or diffusion bonding may be employed.

The above discussion deals with a structure in which the optic axis of the laser medium 1 runs in the y-axis direction and the refractive index nc of the clad 2a and 2b satisfies nx<nc<ny. However, the optic axis of the laser medium 1 formed of the same material may run in the x-axis direction, and the refractive index nc of the clad 2a and 2b may be configured to satisfy ny<nc<nx. In such a structure, the TM-mode laser light polarized in the x-axis direction only is selected.

In addition to these structures, when the laser medium 1 is formed of a material that has the refractive index no for the ordinary ray (TE-mode polarized light) greater than the refractive index ne for the extraordinary ray (TM-mode polarized light), the optic axis of the laser medium 1 may run in the y-axis direction, and the refractive index nc of the clad 2a and 2b may be configured to satisfy ny(=ne)<nc<nx(=no); or the optic axis of the laser medium 1 may run in the x-axis direction, and the refractive index nc of the clad 2a and 2b is configured to satisfy nx(=ne)<nc<ny(=no). With such configurations, in contrast to the above explanation, the laser light having light polarized in the direction orthogonal to the optic axis (TE-mode laser light) propagates through the planar waveguide laser device in the waveguide mode. The laser light having the optic axis polarized light (TM-mode laser light) becomes the emission mode and produces a large loss when propagating in the planar waveguide laser device. As a result, the TE-mode laser light only is selectively amplified and thus the laser light linearly polarized in the x-axis or y-axis direction can be output.

Moreover, laser light linearly polarized in any desired direction can be obtained by arranging the optic axis of the laser medium 1 in the desired direction and using the clad 2a and 2b whose refractive index nc falls within the range between the refractive indexes ne and no of the laser medium 1 for the two linearly polarized lights propagating therein.

According to the first embodiment, a material that has the refractive index nc in the range between the refractive indexes no and ne for the two polarized lights generated by the laser medium 1 is used for the clad 2a and 2b on at least one of the top and bottom surfaces of the laser medium 1. Thus, the polarized light corresponding to the refractive index of the laser medium 1 that is greater than the refractive index nc can be selectively guided through the planar waveguide laser device in the waveguide mode.

Second Embodiment

FIG. 4 is a schematic diagram showing examples of travelling paths of the laser light in the planar waveguide laser device according to the first embodiment. According to the first embodiment, if the refractive index of the outside of the clad 2a and 2b is smaller than the refractive index of the clad 2a and 2b, the laser light in the emission mode escaping into the clad 2a and 2b is reflected at the external boundary of the clad 2a and 2b, and comes back into the laser medium 1, where it is amplified (hereinafter, amplification of light that is not the laser light targeted for outputting is referred to as parasitic amplification), in addition to the laser light oscillated in the waveguide mode L1. This may cause a phenomenon in which the gain accumulated in the laser medium 1 is consumed. In such a situation, the laser light that is reflected at the boundary between the clad 2a and 2b and the outside is directly output through the output end surface, which is an out-of-clad propagating light L2. There is also a total reflection circling mode L3, in which, when the laser light escaping into the clad 2a and 2b in the emission mode and totally reflected at the boundary between the clad 2a and 2b and the outside satisfies the total reflection condition at the output end of the laser medium 1, the laser light is totally trapped in the laser medium 1 and the clad 2a and 2b.

Because the laser lights L2 and L3 that are reflected under the total reflection condition produce small losses, the laser oscillation (hereinafter, "parasitic oscillation") occurs inside the laser medium 1 and the clad 2a and 2b, which consumes the gain in the laser medium 1. As a result, the efficiency of the planar waveguide laser device as an amplifier and a laser oscillator is lowered. Hence, a planar waveguide laser device according to the second embodiment is discussed below, which can selectively amplify and oscillate a desired laser light at high efficiency, by suppressing the reflection of the laser light of the emission mode escaping into the clad 2a and 2b at the boundary between the clad 2a and 2b and the outside.

FIG. 5-1 is a schematic diagram showing a perspective view of the structure of the planar waveguide laser device according to the second embodiment of the present invention, while FIG. 5-2 is a schematic diagram showing a cross section of the structure of the planar waveguide laser device according to the second embodiment. The x-axis, y-axis, and z-axis directions in these drawings are the same as those in FIGS. 1-1 and 1-2 of the first embodiment. The planar waveguide laser device includes the plate-like laser medium 1, the clad 2a and 2b attached respectively to the top and bottom surfaces of the laser medium 1, and absorption layers 5a and 5b attached respectively to the clad 2a and 2b on opposite surfaces to those attached to the laser medium 1 in order to absorb laser light. The absorption layers 5a and 5b may be formed of any material that absorbs laser light, and for example, chromium (Cr) and titanium (Ti) may be adopted.

The laser medium 1 and the clad 2a and 2b according to the second embodiment have the same structures and functions as those of the laser medium 1 and the clad 2a and 2b, respectively, according to the first embodiment illustrated in FIGS. 1-1 and 1-2. In addition, the substrate 3 may be attached to the external surface of either one of the absorption layers 5a and 5b by use of the bonding agent 4 as illustrated in FIGS. 1-1 and 1-2 according to the first embodiment, although it is omitted from the drawings.

Figures 3, 4, 5, 6:
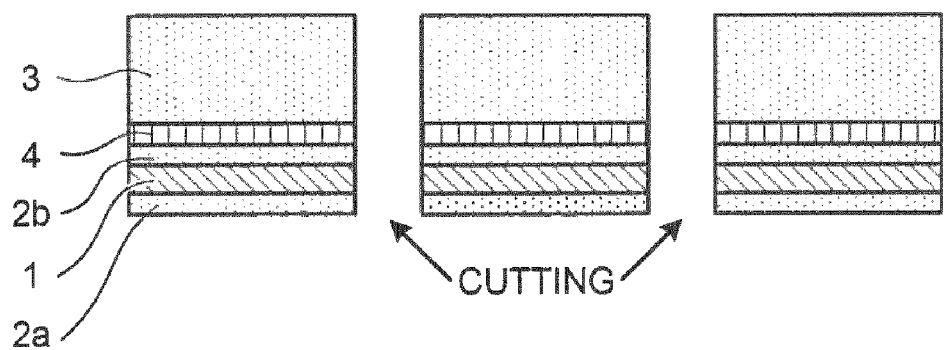
Figure 4:
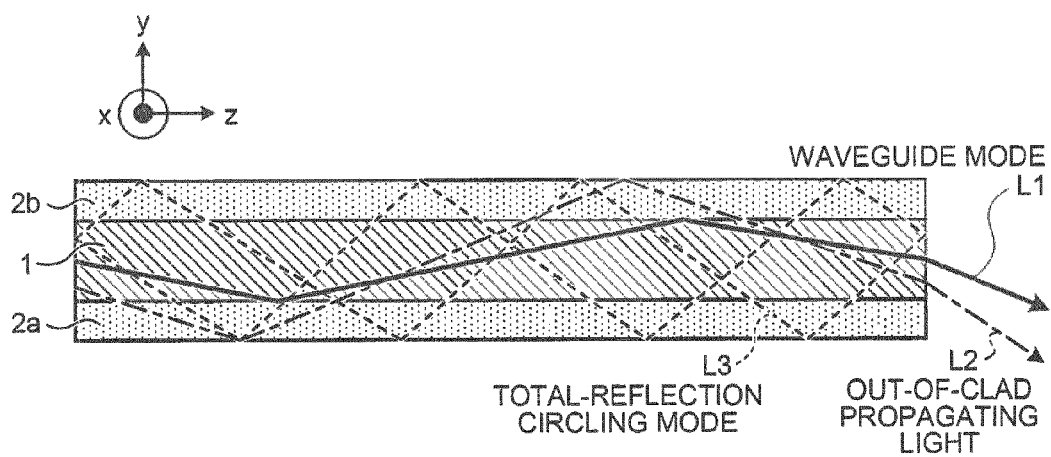
Figures 1, 5:
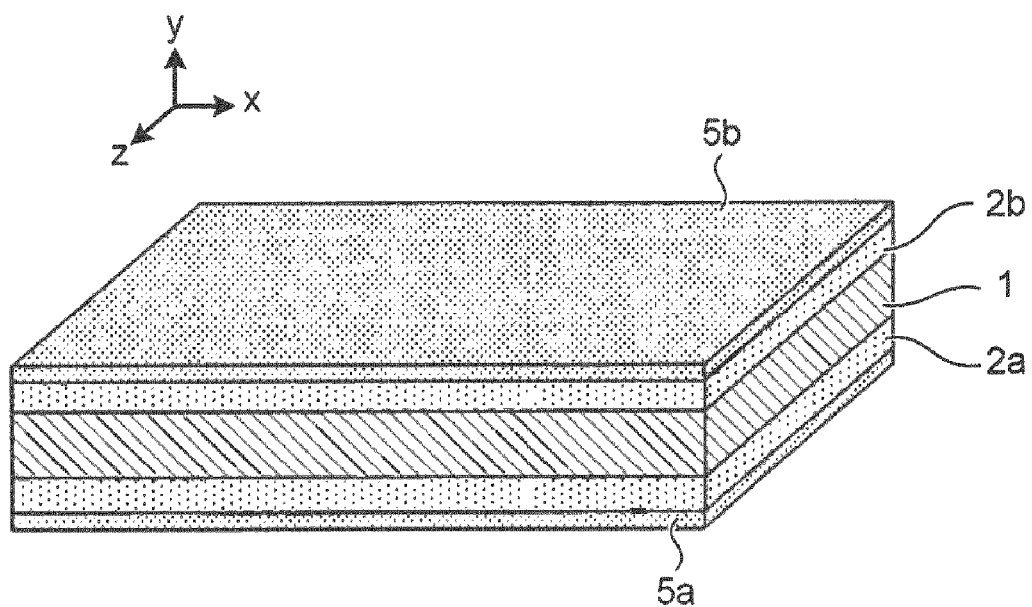
Figures 2, 5:
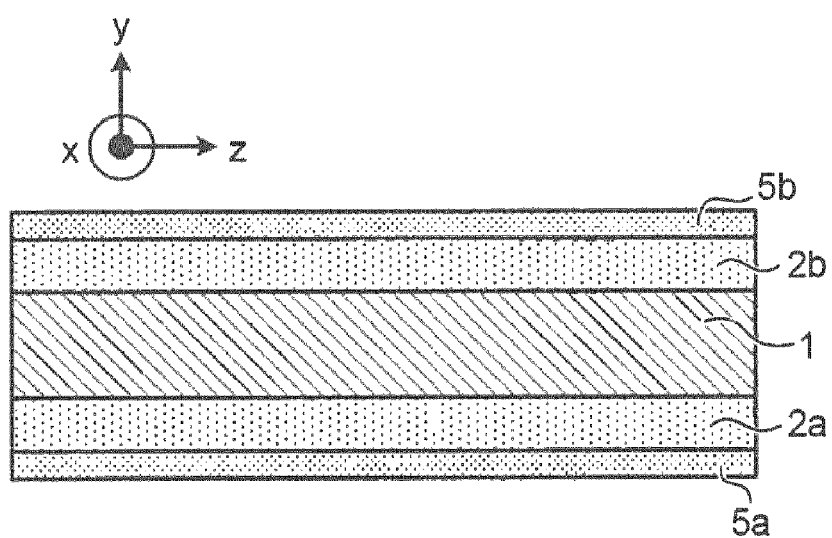
Figure 6:
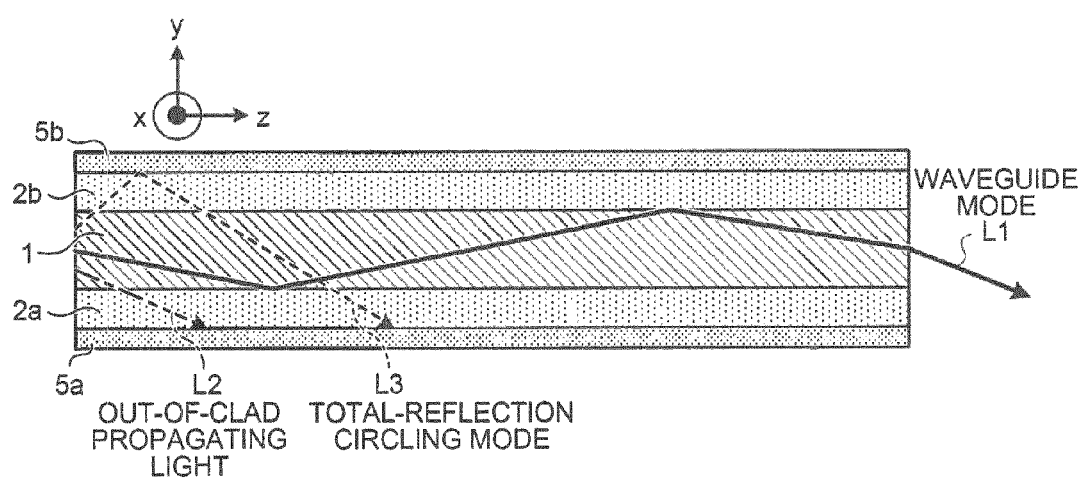

The operation of the planar waveguide laser device having such a structure is now explained. FIG. 6 is a schematic diagram showing laser propagation in the planar waveguide laser device according to the second embodiment. As discussed above, the description adopts, as an example, the planar waveguide laser device having a structure in which the clad 2a and 2b of $Ta_2O_5$ dielectric films are provided on the top and bottom surfaces of the plate-like laser medium 1 of $Nd:YVO_4$ having the c-axis (optic axis) in the y-axis direction. The refractive indexes for this structure are nx(=no) of approximately 1.96, ny(=ne) of approximately 2.17, and nc=2.08.

As explained with reference to FIG. 4, when adopting the planar waveguide laser device that is not provided with the absorption layers 5a and 5b includes the waveguide mode L1 in which the light is totally reflected at the boundary between the core (laser medium 1) and the clad 2a and 2b propagates inside the core, the out-of-clad propagating light L2 that is reflected at the boundary between the clad 2a and 2b and the outside and propagates to be output through the output end surface, and the total reflection circling mode L3 in which the light that is reflected on the boundary between the clad 2a and 2b and the outside and further satisfies the total reflection condition at the output end surface to be completely trapped inside the laser medium 1 and the clad 2a and 2b. Among them, the out-of-clad propagating light L2 and the total reflection circling mode L3 are caused, as explained above, by the polarized light corresponding to a lower refractive index than the refractive index of the clad 2a and 2b, out of the two polarized lights generated in the laser medium 1.

When the out-of-clad propagating light L2 and the total reflection circling mode L3 occur, the gain accumulated in the laser medium 1 is consumed, which reduces the gain for the desired laser light (laser light in the waveguide mode L1) and lowers the efficiency of amplification and oscillation of the laser light. Then, the components other than the waveguide mode L1 are reflected from the boundary between the clad 2a and 2b and the outside. For this reason, the absorption layers 5a and 5b are arranged outside the clad 2a and 2b, as illustrated in FIG. 6 to absorb the components of the laser light reflected on the outside of the clad 2a and 2b. The out-of-clad propagating light L2 and the total reflection circling mode L3 can be thereby suppressed, while the desired laser light that propagates in the waveguide mode L1 can be effectively amplified.

In the production of the planar waveguide laser device having such absorption layers 5a and 5b, after attaching the clad 2b and 2a to the laser medium 1 in FIGS. 3-2 and 3-5 of the first embodiment, the absorption layers 5b and 5a made of chromium, titanium, or the like can be formed by sputtering or vapor deposition, on the surfaces of the clad 2b and 2a that are opposite to the surfaces attached to the laser medium 1.

The metallic films of chromium and titanium can absorb laser light in a wide wavelength range because of its small wavelength dependence for the absorption. Thus, when Nd:YVO$_4$ is adopted for the laser medium 1 to amplify 914-nanometer laser light, it can suppress parasitic oscillation of 914, 1063, and 1342 nanometers at which Nd:YVO$_4$ has gains.

Furthermore, a material that selectively absorbs a wavelength for which the laser medium 1 has the largest gain may be adopted for the absorption layers 5a and 5b. For example, when Nd:YVO$_4$ is adopted for the laser medium 1 to amplify the 914-nanometer laser light, the parasitic amplification and parasitic oscillation of 1064 nanometers should be suppressed because Nd:YVO$_4$ has a large gain at 1064 nanometers. Thus, Cr$^{4+}$:YAG may be used for the absorption layers 5a and 5b. The laser light around 1064 nanometers can be selectively absorbed by using Cr$^{4+}$:YAG so that the parasitic amplification and parasitic oscillation at 1064 nanometers can be suppressed.

In addition, the structure having the absorption layers 5a and 5b attached to the surfaces of the clad 2a and 2b opposite to the laser medium 1 has been discussed in the above explanation, but any structure can be adopted as long as the out-of-clad propagating light L2 and the total reflection circling mode L3 generated in the planar waveguide laser device are suppressed. For example, the outer surfaces of the clad 2a and 2b may be designed as roughened surfaces in place of the absorption layers 5a and 5b. In such a structure, the light reflected on the boundary between the clad 2a and 2b and the outside is scattered on the roughened surface so that losses can be given to the components of the parasitic amplification and the parasitic oscillation.

Furthermore, the absorption layers 5a and 5b may be attached to the roughened surfaces of the clad 2a and 2b. In such a structure, the parasitic amplification and the parasitic oscillation can be suppressed by scattering of the laser light on the roughened surfaces and also by absorption of the laser light with the absorption layers 5a and 5b, and the desired laser light can be thereby effectively amplified.

Furthermore, the same effect can be obtained by arranging the clad 2a or 2b and the absorption layers 5a or 5b only on one side of the laser medium 1. The side on which no clad or absorption layer is provided may be exposed to the air without arranging anything thereon (i.e., to use the air as the clad), or the clad or substrate may be formed of a material having any refractive index smaller than the smaller one of the refractive indexes experienced by the two polarized lights in the laser medium 1.

Furthermore, for example, if the clad 2a and the absorption layer 5b are omitted from FIGS. 5-1 and 5-2, the side of the laser medium 1 that does not have the clad 2a and the absorption layer 5b may be attached to the substrate 3 with the bonding agent 4 having any refractive index smaller than the smaller one of the refractive indexes for the two polarized lights in the laser medium 1. Otherwise, the substrate 3 having any refractive index smaller than the smaller one of the refractive indexes for the two polarized lights in the laser medium 1 may be attached directly to the laser medium 1. When the substrate 3 is attached directly to the laser medium 1, optical contact or diffusion bonding may be adopted.

According to the second embodiment, parasitic amplification and parasitic oscillation can be suppressed by absorbing or scattering the out-of-clad propagating light and the total reflection circling mode generated by the polarized light corresponding to a smaller refractive index of the refractive indexes of the laser medium 1 for the two polarized lights so that desired laser light that propagates in the waveguide mode can be effectively amplified.

INDUSTRIAL APPLICABILITY

As discussed above, the planar waveguide laser device according to the present invention is useful for a laser source that extracts linearly polarized light.

The invention claimed is:

1. A planar waveguide laser device that forms a waveguide by a plate-like laser medium having birefringence and clad attached to at least one of surfaces of the laser medium perpendicular to a thickness direction thereof, amplifies laser light by a gain produced by excitation light incident on the laser medium, and performs laser oscillation, wherein
    the laser medium is formed of a birefringent material that has an optic axis on a cross section perpendicular to a light axis that is a direction in which the laser light travels,
    the clad is formed of a material having a refractive index in a range between refractive indexes of two polarized lights that travel along the light axis in the laser medium and have oscillation surfaces that are orthogonal to each other, and
    the laser medium is YVO$_4$ or GdVO$_4$ that is doped with an active ion, and the clad is a dielectric film of Ta$_2$O$_5$.

2. The planar waveguide laser device according to claim 1, wherein a surface of the clad opposite to a surface attached to the laser medium is a roughened surface that scatters the laser light.

3. The planar waveguide laser device according to claim 1, wherein an absorption layer that absorbs the laser light is further arranged on a surface of the clad opposite to a surface attached to the laser medium.

4. The planar waveguide laser device according to claim 3, wherein the absorption layer is any one of chromium, titanium, and $Cr^{4+}$:YAG.

5. The planar waveguide laser device according to claim 1, wherein a surface of the clad opposite to a surface attached to the laser medium is a roughened surface that scatters the laser light.

6. The planar waveguide laser device according to claim 1, wherein the laser medium is $YVO_4$.

7. The planar waveguide laser device according to claim 1, wherein the laser medium is $GdVO_4$.

* * * * *